United States Patent [19]

Kobayashi

[11] 4,434,619
[45] Mar. 6, 1984

[54] BRAKE MASTER CYLINDER ASSEMBLY

[75] Inventor: Hideyuki Kobayashi, Toyota, Japan

[73] Assignee: Aisen Seiki Kabushiki Kaisha, Kariya, Japan

[21] Appl. No.: 246,176

[22] Filed: Mar. 23, 1981

[30] Foreign Application Priority Data

Mar. 24, 1980 [JP] Japan .................................. 55-38015

[51] Int. Cl.³ ............................................. B60T 13/00
[52] U.S. Cl. ..................................... 60/547.1; 60/577; 60/581; 91/534; 92/49
[58] Field of Search ...................... 60/576, 577, 547.1, 60/562, 581, 574; 92/48, 49, 64, 65; 91/534, 536

[56] References Cited

U.S. PATENT DOCUMENTS

| | | | |
|---|---|---|---|
| 3,062,011 | 11/1962 | Brooks | 60/577 |
| 3,125,003 | 3/1964 | Hoekstra | 91/376 |
| 3,191,384 | 6/1965 | Krusemark | 60/577 |
| 3,249,021 | 5/1966 | Wuellner | 91/369 |
| 3,540,219 | 11/1970 | Huruta | 60/577 |
| 3,659,500 | 5/1972 | Akman | 92/49 |
| 3,688,647 | 9/1972 | Kytta | 91/369 A |
| 3,724,211 | 4/1973 | Julow | 60/54.6 P |
| 3,981,146 | 9/1976 | Fogelberg et al. | 60/574 |
| 4,133,178 | 1/1979 | Brooks, Sr. | 60/578 |
| 4,200,029 | 4/1980 | Ohmi | 91/369 A |
| 4,237,076 | 12/1980 | Benjamin | 92/49 |
| 4,244,185 | 1/1981 | Belart | 60/577 |

FOREIGN PATENT DOCUMENTS 2920249  11/1979  Fed. Rep. of Germany .......... 92/48

Primary Examiner—Abraham Hershkovitz
Attorney, Agent, or Firm—Finnegan, Henderson, Farabow, Garrett & Dunner

[57] ABSTRACT

A brake master cylinder assembly comprising a cylinder body having a stepped axial bore with large and small diameter portions, a tubular piston slidably disposed in the large diameter portion, and a primary piston one end being slidably disposed in the tubular piston and the other end in the small diameter portion, the primary piston being operatively connected to the brake pedal. The other end of the primary piston defines a pressure chamber in the small diameter portion in communication with the brakes. The primary and tubular pistons define an annular pressure chamber in the large diameter portion. Actuator means indirectly responsive to movement of the brake pedal moves the tubular piston to create low pressure in the annular pressure chamber which is in restricted fluid communication with the pressure chamber providing braking pressure at idle with reduced force on the brake pedal required.

5 Claims, 3 Drawing Figures

BRAKE MASTER CYLINDER ASSEMBLY

BACKGROUND OF THE INVENTION

1. Field of the Invention

The present invention relates to a brake master cylinder assembly for automotive vehicles, and more particularly to a brake master cylinder assembly including a pressure chamber for generating high braking pressure during actual braking and an annular pressure chamber for supplying low pressure fluid into the pressure chamber for braking during idle.

2. Description of the Prior Art

In the conventional brake master cylinder assembly, a stepped piston operatively connected to a brake pedal or brake booster is disposed in a stepped axial bore of a cylinder body defining a pressure chamber in communication through an outlet with the vehicle brakes. The pressure chamber generates high braking pressure for braking the vehicle while in motion, that is, the actual braking stage. The brake master cylinder also includes an annular pressure chamber for supplying low pressure fluid into the pressure chamber for braking the vehicle while at idle. In known brake master cylinders, the pressure in the annular chamber is limited, by a relief valve, to a maximum which is below a predetermined pressure to eliminate clearance between the brake pads or brake shoe and disc or drum, respectively.

In the conventional brake master cylinder assembly, however, the pressure in the annular chamber is generated by the force transmitted directly from the brake pedal or the brake booster thereby requiring increased brake pedal depressing force when the car is at idle.

The present invention is intended to provide a brake master assembly wherein the force required for depressing the brake pedal is reduced from that required by conventional brake master assemblies. Furthermore, the present invention provides a brake master cylinder assembly wherein the volume of low pressure fluid supplied from the annular pressure chamber into the pressure chamber communicating with the brakes may be constant.

SUMMARY OF THE INVENTION

The objects and advantages of the invention may be realized and attained by means of the instrumentalities and combinations particularly pointed out in the appended claims.

In accordance with the purpose of the invention, as embodied and broadly described herein, the brake master cylinder assembly responsive to brake pedal motion comprises a cylinder body having a stepped axial bore including a large diameter portion at one end and a small diameter portion at the other end; a tubular piston having an axial bore slidably disposed in the large diameter portion; a primary piston having axially opposed end portions, one end portion being slidably disposed in the small diameter portion and the oher end portion being slidably disposed in the bore of the tubular piston, the primary piston being operatively connected to the brake pedal at the other end portion thereof; a pressure chamber in the small diameter portion defined by the one end portion of the primary piston, the pressure chamber in fluid communication with an outlet in the cylinder body; an annular pressure chamber defined by the primary piston and the tubular piston in restricted fluid communication with the pressure chamber for supplying fluid at low pressure into the pressure chamber; and actuator means responsive to movement of the brake pedal for operating the tubular piston to create a low pressure in the annular pressure chamber.

Preferably, the actuator means is a vacuum actuator. It is also preferred that the master cylinder include a vacuum brake booster operatively interconnecting the brake pedal and the primary piston and wherein the vacuum actuator is disposed within the brake booster.

In the preferred embodiment, the vacuum brake booster comprises a power piston operatively connected to the primary piston and separating the booster into the first and second chambers normally in fluid communication with each other, the first chamber being in fluid communication with a substantial vacuum, and valve means operatively connected to the pedal for selectively interrupting fluid communication between the chambers and connecting the second chamber to atmospheric pressure.

Additionally, the vacuum actuator preferably comprises a diaphragm piston operatively connected to the tubular piston and separating the actuator into first and second actuator chambers normally in fluid communication with each other, the first actuator chamber being in fluid communication with the first chamber, and means for selectively interrupting fluid communication between the actuator chambers and connecting the second actuator chamber to atmospheric pressure.

BRIEF DESCRIPTION OF THE DRAWINGS

The accompanying drawings, which are incorporated in and constitute a part of the specification, illustrate one embodiment of the invention, and together with the description, serve to explain the principles of the invention.

DETAILED DESCRIPTION OF THE PREFERRED EMBODIMENTS

Figure 1:
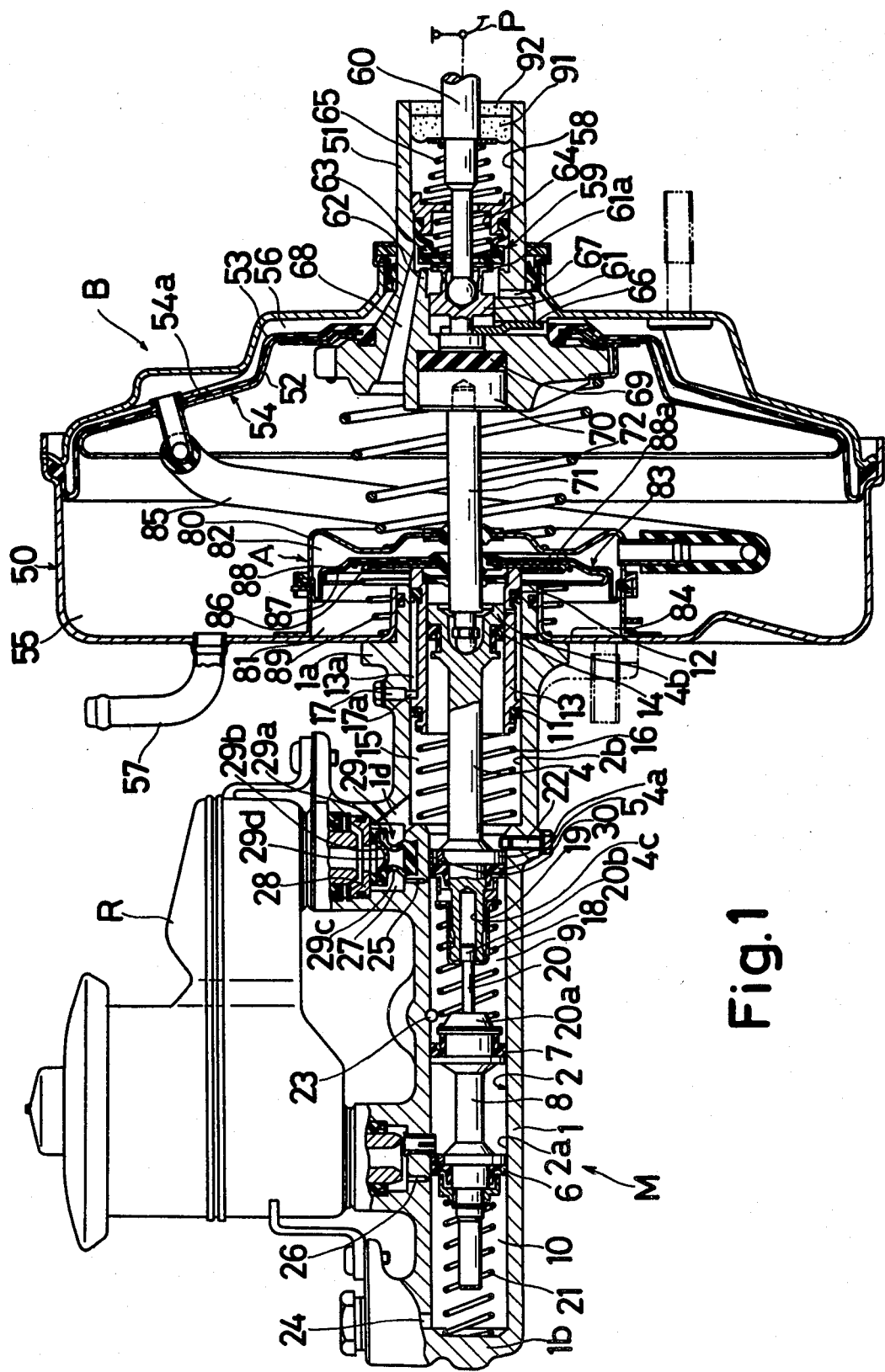
FIG. 1 is a longitudinal cross-sectional view of an embodiment of the brake master cylinder assembly according to the present invention.

Reference will now be made in detail to the present preferred embodiments of the invention, examples of which are illustrated in the accompanying drawings. Referring to FIG. 1, it may be seen that the brake master cylinder assembly of the present invention comprises generally a brake master cylinder assembly M and a vacuum brake booster B.

In accordance with the invention, the brake master cylinder assembly responsive to brake pedal motion comprises a cylinder body having a stepped axial bore including a large diameter portion in one end and a small diameter portion at the other end. As herein embodied, the brake master cylinder assembly M depicted in FIG. 1 is responsive to motion of brake pedal P and includes a cylinder body 1 having a stepped axial bore 2 including a large diameter portion 2b at one end thereof proximate the vacuum brake booster B and a small diameter portion 2a at the other end remote from the brake booster B.

In accordance with the invention, a tubular piston having an axial bore is slidably disposed in the large diameter portion. As depicted in FIG. 1, tubular piston 13 is slidably disposed in large diameter portion 2b of axial bore 2 in cylinder body 1.

In accordance with the invention, a primary piston having axially opposed end portions is provided with one end portion being slidably disposed in the small diameter portion and the other end portion being slidably disposed in the bore of the tubular piston. The primary piston is operatively connected to the brake pedal at the other end portion thereof. As seen in FIG. 1, primary piston 4 has axially opposed end portions 4a and 4b. One end portion 4a is slidably disposed in small diameter portion 2a and the other end portion 4b is slidably disposed in the bore of tubular piston 13. The primary piston 4 is operatively connected through brake booster B to brake pedal P at the other end portion 4b.

In accordance with the invention, a pressure chamber in the small diameter portion is defined by one end of the primary piston, the pressure chamber being in fluid communication with an outlet in the cylinder body. As depicted in FIG. 1, one end portion 4a of primary piston 4 is slidably disposed in one end of the small diameter portion 2a of the axial bore 2 and defines within the small diameter portion 2a a pressure chamber. Sealing cup 5 disposed in the small portion 2a in conjunction with the one end portion 4a serves to seal the pressure chamber.

The small diameter portion 2a also slidably receives therein a secondary or floating piston 8 provided with annular sealing cup 6 and 7. Floating piston 8 and associated sealing cup 6 and 7 divide the pressure chamber into first pressure chamber 9 between primary piston 4 and floating piston 8 and a second pressure chamber 10 between the end wall portion 1b of cylinder body 1 and piston 8. Return spring 18 is positioned in the first pressure chamber 9 interposed between retainer 19 fixed to the one end portion 4a of primary piston 4 and left end portion 20a of intermediate member 20. Intermediate member 20 includes a right end portion 20b slidably positioned in an axial bore 4c of primary piston 4 and contacts at the left end face thereof with a right end face of floating piston 8. Return spring 21 is positioned in the second pressure chamber 10 and urges floating piston 8 to move in a rightward direction. The force of return spring 21 is smaller than that of return spring 18.

Stopper bolt 22 is fixed to cylinder body 1 and has an extreme end 22a extending into the annular chamber 15 and engageable with primary piston 4. Thus, primary piston 4 and floating piston 8 are normally held in returned position as shown in FIG. 1.

Cylinder body 1 is provided with first and second outlets 23, 24 in normal fluid communication with first and second pressure chambers 9, 10, respectively, and first and second compensating ports 25, 26. In the normal conditions shown in FIG. 1, first pressure chamber 9 communicates with valve chamber 27 through first compensating port 25 and second pressure chamber 10 communicates with reservoir R through second compensating port 26.

In accordance with the invention, an annular pressure chamber is defined by the primary piston and the tubular piston and is in restricted fluid communication with the pressure chamber for supplying fluid at low pressure into the pressure chamber.

Preferably, as seen in FIG. 1, tubular piston 13 is provided with annular sealing cups 11, 12, and slidably receives in its bore a right end portion 4b of primary piston 4. The right end portion 4b has a diameter substantially equal to that of left end portion 4a of primary piston 4. Annular sealing cup 14 is disposed in conjunction with other end portion 4b of primary piston 4 to define annular pressure chamber 15 within the cylinder body 1.

Return spring 16 is positioned in annular pressure chamber 15 to urge tubular piston 13 to move to the right as depicted in FIG. 1. Stopper bolt 17 is fixed to body 1 and has an extreme end 17a extending into an annular groove 13a on the outer periphery of the tubular piston 13. Tubular piston 13 is normally held in its return position as shown in FIG. 1.

Valve chamber 27 is in normal fluid flow communication with annular pressure chamber 15 through passage 1d in body 1 and is provided therein with a check valve 29 which permits fluid flow from the reservoir R to valve chamber 27 but restricts fluid flow from the valve chamber 27 to reservoir R. Check valve 29 includes a hollow resilient member 29a fixed at the lower end thereof to the body 1 and a plate member 29b disposed in an upper portion of the resilient member 29a. Valve chamber 27 is in normal fluid communication with reservoir R through openings 29c formed in the resilient member 29a and a compensating port 29d in the plate member 29b.

The one end 4a of primary piston 4 is provided with passages 30 to permit transmittal of pressurized fluid in the annular pressure chamber 15 into the first pressure chamber 9 through an annular passage between sealing cup 5 and body 1. The annular passage between sealing cup 5 and body 1 appears when the pressure in annular chamber 15 is higher than the pressure in first pressure chamber 9.

Preferably, the brake master cylinder assembly also includes a vacuum brake booster B operatively interconnecting the brake pedal P with the primary piston 4. As seen in FIG. 1, the vacuum brake booster B comprises a power piston 54 including a central core member 51, a disc plate 52 and diaphragm 53. Power piston 54 divides the space within housing 50 into first and second chambers 55, 56, respectively. First chamber 55 is in normal fluid communication with a substantial vacuum in the engine intake manifold (not shown) through port 57 in housing 50.

In a central opening in housing 50 opposite the opening in which cylinder body 1 is disposed, central core member 51 is secured. Central core member 51 has an axial bore 58 in which a control valve mechanism 59 for controlling fluid communications between second chamber 56 and first chamber 55 and second chamber 56 and the atmosphere is disposed. Control valve mechanism 59 includes push rod 60 axially disposed in the control valve mechanism, one end of which is operatively connected to brake pedal P. Also included in the control mechansim 59 is air-valve member 61 to which the other end of push rod 60 is connected. Annular control valve 63 disposed around push rod 60 is seatable on the seat 61a of air valve member 61. Spring 64 urges control valve member 63 to move in a leftward direction as depicted in FIG. 1. Spring 65 urges push rod 60 and air valve member 61 to move in a rightward direction. Key member 66 defines the sliding stroke of air valve member 61 relative to the central core member 51. In normal condition, air valve member 61 is held in return position as depicted in FIG. 1 wherein seat 61a of air valve member 61 is disposed in contact with control valve 63 and control valve 63 is spaced from valve seat 62 of central core member 51 so that fluid flow communication between second chamber 56 and first chamber 55 exists through passage 67 in central core member 51, the clearance between control valve 63 and valve seat 62, and passage 68 in central core member 51.

As seen in FIG. 1, at the left end of core member 51 is reaction disc 69 made of rubber and a cylindrical member 70 slidable within core member 51. Cylindrical member 70 is fixed to an output rod 71 which engages primary piston 4 of the brake master cylinder assembly M. Return spring 72 in first chamber 55 urges power piston 54 to move in a rightward direction as depicted in FIG. 1. In a normal condition, power piston 54 is held by return spring 72 in its returned position depicted in FIG. 1 where projections 54a formed on diaphragm 53 abut housing 50.

In accordance with the invention, the brake master cylinder assembly further comprises actuator means responsive to movement of the brake pedal for operating the tubular piston to create low pressure in the annular pressure chamber. Preferably, the actuator means is a vacuum actuator disposed within brake booster B. As depicted in FIG. 1, vacuum actuator A is positioned within first chamber 55 of booster B and comprises housing 80 fixed to housing 50 and diaphragm piston 83 dividing the inner space of housing 80 into first and second chambers 81, 82, respectively. Preferably, first actuator chamber 81 and second actuator chamber 82 are normally in indirect fluid communication.

First actuator chamber 81 is in fluid communication with first chamber 55 through opening 84 in housing 80 and thus in indirect fluid communication with the engine intake manifold through port 57.

Preferably, means for selectively interrupting fluid communication between the actuator chambers 81, 82 and connecting the second actuator chamber 82 to atmospheric pressure is provided.

In the embodiment of FIG. 1, second chamber 82 is in normal fluid communication with second chamber 56 through flexible pipe 85. Diaphragm piston 83 includes disc members 86, 87 and diaphragm 88 and engages with the right end, as seen in FIG. 1, of tubular piston 13 in brake master cylinder assembly M. Return spring 89 disposed in first chamber 81 urges piston 83 to move in a rightwardly direction as seen in FIG. 1. In the normal condition, piston 83 is held in its return position as depicted in FIG. 1 wherein projections 88a formed on diaphragm 88 abut the housing 80.

Figure 2:
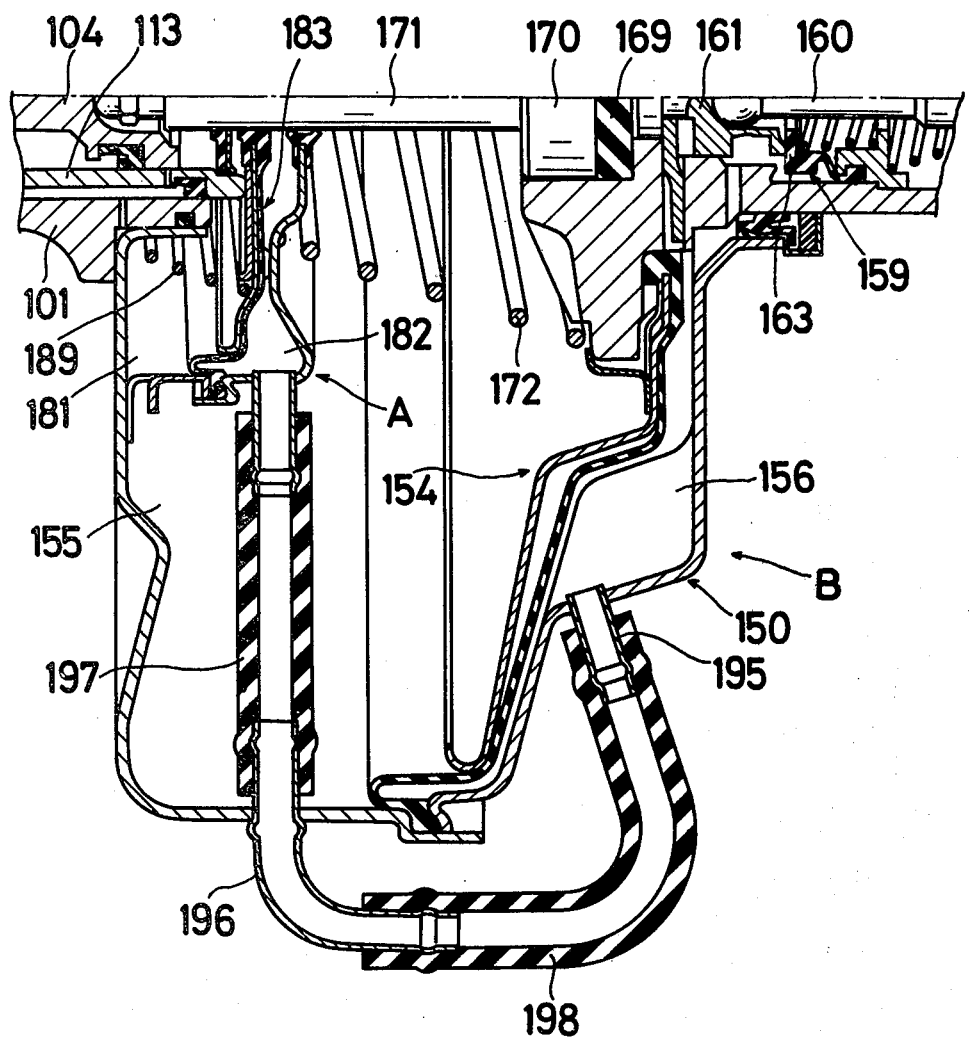
FIG. 2 is a fragmentary longitudinal cross-sectional view of another embodiment of the brake master cylinder assembly according to the present invention.

Referring to FIG. 2, a partial cutaway sectional view of the second embodiment of the brake master cylinder assembly according to the present invention is depicted. The structure identical to that of the first embodiment is designated with the same numeral preceded by 1. In the embodiment of FIG. 2, fluid communication between second actuator chamber 182 and second chamber 156 is achieved through conduit comprising flexible and rigid sections 197, 196, 198, 195.

Figure 3:
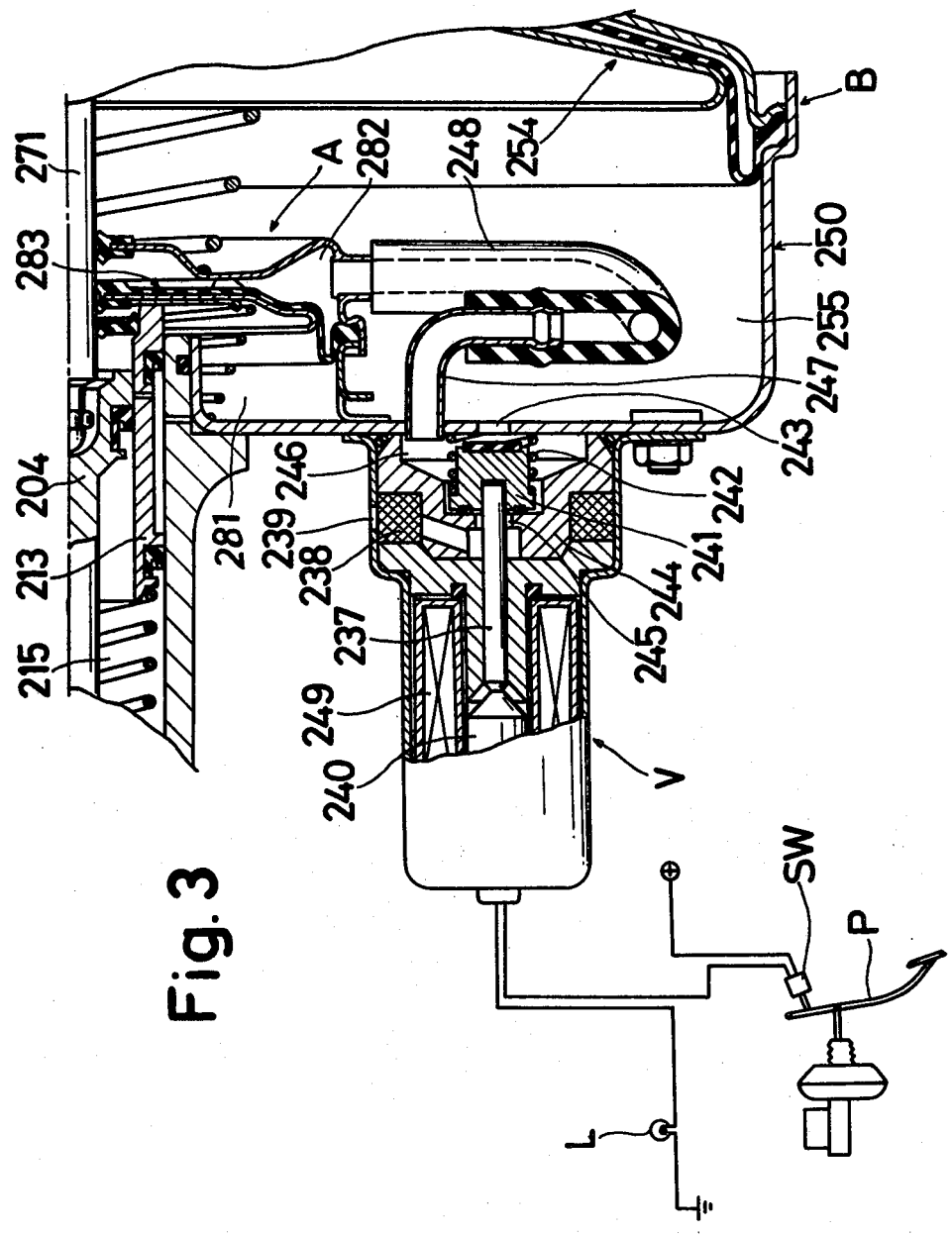
FIG. 3 is a fragmentary longitudinal cross-sectional view of still another embodiment of the brake master cylinder assembly according to the present invention.

FIG. 3 depicts a third embodiment of the subject invention where elements common to the first and second embodiments are numbered identically with a 2 preceding the number. In this embodiment, conduit means 248 places second actuator chamber 282 in fluid communication with first chamber 255. First chamber 255 is in normal communication with first actuator chamber 281. Solenoid actuating valve V is placed in the line of communication between second actuator 282 and first chamber 255 and provides means for selectively interrupting fluid communication between the chambers and for connecting the second actuator chamber to atmospheric pressure.

Changeover solenoid valve V comprises valve member 241 located in valve chamber 249 and spring 242 urging valve member 241 to move left as depicted in FIG. 3. Valve member 241 normally closes the passage 245 communicating with atmosphere through filter 238 and opening 239 and normally opens opening 243 formed in housing 250 providing fluid communication between second actuator chamber 282 and first chamber 255 via flexible conduit 248, rigid conduit 247, chamber 246 and opening 243.

Solenoid 249 is connected at one terminal thereof to a battery (not shown) through a normally open switch SW which closes when the brake pedal P is depressed. The other terminal in solenoid 249 is grounded through a brake lamp L. When the solenoid 249 is energized, plunger 240 moves in a rightward direction as depicted in FIG. 3, moving rod 237 and valve member 241 in a rightward direction.

Referring again to FIG. 1, the brake master cylinder assembly is depicted in the normal condition wherein the brake pedal P is released. When the brake pedal P is depressed, push rod 60 moves in a leftward direction as depicted in FIG. 1 to move air valve member 61 leftward. Movement of air valve member 61 allows spring 64 to move control valve 63 to a position where control valve 63 seats on valve seat 62 to interrupt communication between first and second chambers 55, 56. Thereafter, right end 61a of air valve member 61 is spaced from control valve 63 thereby admitting the atmosphere to second chamber 56 through air filters 91, 92, clearance between control valve 63 and right end 61a of air valve member 61, and passage 67.

Atmospheric pressure in second chamber 56 is communicated through flexible pipe 85 to second actuator chamber 82. The pressure difference between first and second chambers 55, 56 of booster B and the pressure difference between first and second actuator chambers 81, 82 of actuator A are generated to force piston 54 and piston 83 leftwardly as seen in FIG. 1. Primary piston 4 and floating piston 8 of master cylinder assembly M are moved by the power piston 54 of booster B leftwardly as seen in FIG. 1 to interrupt the communication between the first and second pressure chambers 9 and 10 and first and second compensating ports 25, 26, respectively. The fluid in first and second chambers 9, 10 is displaced through first and second outlets 23, 24, respectively.

Simultaneously, a tubular piston 13 of brake master cylinder assembly M is moved by piston 83 of actuator A in a left direction as seen in FIG. 1. Movement of tubular piston 13 displaced fluid in annular pressure chamber 15 through passages 30 of primary piston 4 and annular passage between sealing cup 5 and body 1 into first pressure chamber 9.

The movement of tubular piston 13 in a leftward direction is stopped by engagement of diaphragm piston 83 with the right end of cylinder body 1. Further increase in pressure in first and second pressure chambers 9 and 10 is obtained by force transmitted from booster B.

The reaction force generated by the pressure in first and second chambers 9, 10 is transmitted to brake pedal P while the reaction force generated by the pressure in annular chamber 15 is not transmitted to brake pedal P.

It is preferable that the movement of piston 83 of actuator A in a leftward direction be terminated before starting movement of the power piston 54 of booster B to reduce the length of the brake pedal stroke.

When brake pedal P is released, air valve member 61 is moved by spring 65 in a rightward direction to seat on control valve 63 thereby interrupting fluid communication between chamber 56 and the atmosphere. Subsequently control valve 63 becomes spaced from valve seat 62 thereby reestablishing communication between first and second chambers 55, 56. The pressure difference between the chambers 55, 56 and the pressure difference between actuator chambers 81, 82 are eliminated so that the power piston 54 and the diaphragm piston 83 are returned by return spring 72 and 89, respectively. Accordingly, primary and floating pistons 4,8 are returned by return springs 18, 21, respectively, and tubular piston 13 is returned by return spring 16.

On return of tubular piston 13, if a vacuum is generated in annular chamber 15, check valve 29 will become spaced from valve seat 28 thereby admitting fluid from reservoir R to chamber 15 through the clearance between check valve 29 and valve seat 28 and channel 1d.

In the embodiment depicted in FIG. 3, when brake pedal P is depressed, switch SW closes energizing solenoid 249 and brake lamp L. Plunger 240 moves in a rightward direction, as depicted in FIG. 3, to move valve member 241 thereby opening passage 245 and closing opening 243 to place second actuator chamber 282 in communication with atmosphere. The quantity of flow of atmospheric pressure into second actuator chamber 282 is substantially constant so that piston 283 moves in a leftward direction at a substantially constant speed. Thus, the volume of fluid in annular chamber 215 passing to the reservoir R through passage 1d and compensating port 29d (FIG. 1) is constant. Therefore, the volume of fluid displaced from annular chamber 215 to the first pressure chamber corresponding to chamber 9 of FIG. 1 is also constant.

The volume of fluid flow at atmospheric pressure admitted into second actuator changer 282 is designed to be independent of the operational characteristics of booster B so that operation of actuator A may be eliminated before starting operation of booster B.

It will be apparent to those skilled in the art that various modifications and variations could be made in the brake master cylinders of the invention without departing from the scope or spirit of the invention.

What is claimed is:

1. A brake master cylinder assembly responsive to motion of a brake pedal, comprising:
    (a) a cylinder body having a stepped axial bore including a large diameter portion at one end and a small diameter portion at the other end;
    (b) a tubular piston having an axial bore slidably disposed in said large diameter portion;
    (c) a primary piston having axially opposed end portions, one said end portion being slidably disposed in said small diameter portion and the other said end portion being slidably disposed in the bore of said tubular piston for axial movement relative to said tubular piston in response to an axial force without transmitting the axial force to said tubular piston, said primary piston being operatively connected to said brake pedal at the other end portion thereof;
    (d) a pressure chamber in said small diameter portion defined by the one end portion of said primary piston, said pressure chamber being in fluid communication with an outlet in said cylinder body;
    (e) an annular pressure chamber defined by said primary piston and said tubular piston in restricted fluid communication with said pressure chamber for supplying fluid at low pressure in said pressure chamber;
    (f) a vacuum brake booster operatively interconnecting said brake pedal and said primary piston, said brake booster comprising a power piston operatively connected to said primary piston, said power piston separating said booster into first and second chambers normally in fluid communication with each other, said first chamber being positioned between said cylinder body and said power piston and being in fluid communication with a substantial vacuum and valve means operatively connected to said brake pedal for selectively interrupting fluid communication between said chambers and connecting said second chamber to atmospheric pressure;
    (g) a vacuum actuator disposed in said brake booster and comprising a diaphragm piston operatively connected to said tubular piston, said diaphragm piston separating said actuator into first and second actuator chambers normally in fluid communication with each other, said first actuator chamber being positioned between said cylinder body and said diaphragm piston and being in fluid communication with said first chamber, and means for selectively interrupting fluid communication between said actuator chambers and connecting said second actuator chamber to atmospheric pressure, said vacuum actuator being responsive to movement of said brake pedal for moving said tubular piston relative to said primary piston toward the other end of said cylinder body to create low pressure in said annular pressure chamber and for preventing said brake pedal from receiving the reaction force on said tubular piston generated by said low pressure;
    (h) first return spring means for axially urging said primary piston toward said one end of said cylinder body to normally hold said primary piston in its return position; and
    (i) second return spring means independent of said first return spring means for axially urging said tubular piston toward said one end of said cylinder body to normally hold said tubular piston in its return position.

2. The master cylinder as in claim 1 also including conduit means for placing said second chamber in fluid communication with said second actuator chamber, said second actuator chamber normally communicating with said first actuator chamber through said conduit means, said second chamber, said valve means and said first chamber and wherein said interrupting means is said valve means.

3. The master cylinder as in claim 1 also including conduit means for placing said second actuator chamber in fluid communication with said first chamber, said second actuator chamber normally communicating with said first actuator chamber through said conduit means and said first chamber, and wheein said interrupting means is a solenoid actuated valve responsive to movement of said brake pedal, said solenoid valve being disposed in said conduit means to selectively interrupt flow through said conduit means and connect said second actuator chamber to atmospheric pressure.

4. The master cylinder as in claims 2 or 1 wherein said opposed end portions of said primary piston are substantially equal in diameter.

5. The master cylinder as in claim 2 or 1 wherein said second return spring means is positioned in said annular pressure chamber.

* * * * *